Patented Apr. 5, 1932

1,852,826

UNITED STATES PATENT OFFICE

FRANZ SKAUFY, OF BERLIN, GERMANY, ASSIGNOR TO GENERAL ELECTRIC COMPANY, A CORPORATION OF NEW YORK

DISCHARGE DEVICE ELECTRODE

No Drawing. Application filed April 30, 1923, Serial No. 635,786, and in Germany May 2, 1922.

The present invention relates to electric discharge devices, as for example, ionization glow lamps, and it is the object of my invention to improve the operating characteristics of these devices by lowering the voltage drop.

In accordance with my invention one or more of the electrodes in such a device are provided with a surface coating of an alkaline earth metal, preferably barium. My invention also includes a method of applying the surface coating of desired alkaline metal.

The electrodes of the device which may consist as usual of sheets, plates, wire or the like, consisting of an easily workable, non-alkaline metal, such as iron or nickel, are provided on their surface with a compound or a reaction mixture which in the course of the manufacture of the lamp is decomposed thereby furnishing the desired metal which is present either as a superficial layer on the foundation metal or is alloyed therewith. For example, the electrode of base metal, such as nickel or iron, may be provided with a coating of metallic barium by applying a non-oxygenous decomposable compound, such as an azide of barium, $BaN_6$, upon the surface and then decomposing this material after the electrode has been sealed into the electrical discharge device. The azide may be applied as a solution by painting or spreading the solution upon the surface of the electrode or by dipping the electrode into an azide solution, or in any other convenient way. The layer of barium or other material may also be applied upon the surface of an electrode by rolling either before or after the iron electrode has been brought into the desired form by stamping, pressing, or otherwise. In some cases the compound of alkali metal may be applied upon the electrodes either before or after the electrodes are mounted in the container. The decomposition of the compound occurs during the subsequent heating in the manufacture of the device leaving the desired film of metal upon the surface of the electrode. Good results are obtained if barium azide is applied after the electrode surface has been roughened or rendered dull.

After evaporation of the water or other solvents from the electrodes, the lamps or other devices containing the electrodes are heated upon a pump to an elevated temperature, by passage of a discharge between the electrodes or by an external source of heat, thereby decomposing the azide, and the dissociated nitrogen is removed by pumping. After a desired vacuum has been produced in the lamp, a neon or other suitable inert gaseous filling is introduced and the bulb is then sealed in the usual way.

In this manner glow lamps suitable for operation on 110 volt alternating current circuits may be produced in a simple and convenient way. Lamps of this character also show a higher lighting efficiency.

In place of azide solutions fluid suspension may be used. The mixture of azide which upon decomposition will form alloys may also be used. As I have found the behavior of lithium to be similar to alkaline earth metals, I wish in the appended claims to also cover electrical ionization devices containing an electrode in which lithium constitutes the active material.

What I claim as new and desire to secure by Letters Patent of the United States, is:

1. The method of lowering the resistance and improving the efficiency of gaseous glow devices which consists in coating an electrode of said device with a compound of an alkaline earth metal, decomposing said compound at a temperature at which said metal remains on said electrode, removing decomposition products and thereafter introducing a desired gas filling into said device.

2. An electric glow lamp comprising a sealed container, nickel electrodes therein one or more of which are provided with a surface layer of barium and a gaseous filling which is inert with respect to barium.

3. An electric glow discharge device comprising a sealed container, electrodes therein constituted of non-alkaline material, a coating of barium thereon and a gas inactive with respect to barium at a pressure sufficiently high to permit a glow discharge to be carried thereby.

4. An electric glow lamp provided with cooperating base metal electrodes one at least of which is coated with barium, and a filling of neon.

5. The process of providing an electrode of an electrical discharge device with a coating of a non-oxygenous composition capable of yielding an alkaline earth metal, heating said compound to the decomposition temperature of said compound and pumping out gaseous products evolved during heating.

6. The process of providing an electrode of an electrical discharge device with an alkaline earth metal which consists in roughening the surface of said electrode, applying thereon as a coating the azide of the desired metal, heating said electrode to the decomposition temperature of said azide, and removing decomposition products.

7. An electrode for electric glow lamps and the like comprising a nickel support and a surface layer of barium thereon.

In witness whereof, I have hereunto set my hand this 11th day of April, 1923.

FRANZ SKAUPY.